(12) United States Patent
Moss

(10) Patent No.: US 11,634,644 B2
(45) Date of Patent: *Apr. 25, 2023

(54) FAST PYROLYSIS HEAT EXCHANGER SYSTEM AND METHOD

(71) Applicant: Kenneth D. Moss, Gretna, VA (US)

(72) Inventor: Kenneth D. Moss, Gretna, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/922,976

(22) Filed: Mar. 16, 2018

(65) Prior Publication Data

US 2018/0201841 A1    Jul. 19, 2018

Related U.S. Application Data

(63) Continuation of application No. 13/722,069, filed on Dec. 20, 2012, now Pat. No. 9,920,252, which is a continuation-in-part of application No. 13/681,450, filed on Nov. 20, 2012, now abandoned.

(60) Provisional application No. 61/563,471, filed on Nov. 23, 2011.

(51) Int. Cl.
| | |
|---|---|
| *C10B 21/20* | (2006.01) |
| *C10B 49/16* | (2006.01) |
| *C10G 9/30* | (2006.01) |
| *C10G 9/28* | (2006.01) |
| *C10B 49/18* | (2006.01) |
| *C10B 53/02* | (2006.01) |

(52) U.S. Cl.
CPC .............. *C10B 21/20* (2013.01); *C10B 49/16* (2013.01); *C10B 49/18* (2013.01); *C10B 53/02* (2013.01); *C10G 9/28* (2013.01); *C10G 9/30* (2013.01); *Y02E 50/10* (2013.01)

(58) Field of Classification Search
CPC ......... C10B 21/20; C10B 49/16; C10B 49/18; C10B 53/02; C10G 9/28; C10G 9/30; Y02E 50/10
See application file for complete search history.

(56) References Cited

U.S. PATENT DOCUMENTS

| | | | | |
|---|---|---|---|---|
| 2,844,519 A | * | 7/1958 | Vaell ...................... | C10G 11/16 422/223 |
| 7,905,990 B2 | * | 3/2011 | Freel ....................... | C10B 49/22 585/242 |
| 8,377,287 B2 | * | 2/2013 | Graham .................. | C10G 9/28 208/126 |
| 8,574,404 B1 | * | 11/2013 | Sinclair ................... | C10B 49/18 585/242 |
| 8,961,743 B2 | * | 2/2015 | Freel ....................... | C10B 57/00 202/121 |
| 9,062,264 B2 | * | 6/2015 | Ramirez Corredores ................... | C11C 1/10 |
| 9,920,252 B2 | * | 3/2018 | Moss ....................... | C10B 49/16 |

(Continued)

*Primary Examiner* — Jonathan Miller
(74) *Attorney, Agent, or Firm* — Workman Nydegger; Logan Christenson; John Guynn

(57) ABSTRACT

A fast pyrolysis heat exchanger system for economically and efficiently converting biomass and other combustible materials into bio-oil. The system employs multiple closed loop tubes situated inside the heat exchanger. As a granular solid heat carrier is deposited at the top of the heat exchanger and caused to move downwardly therethrough, heat is transferred from the tubes to the heat carrier which is then transferred to a reactor where it is placed in contact with the combustible materials.

5 Claims, 4 Drawing Sheets

(56) References Cited

U.S. PATENT DOCUMENTS

2010/0163395 A1* 7/2010 Henrich .................. C10B 53/02
  201/2.5
2012/0266529 A1* 10/2012 Scahill ...................... C10C 5/00
  202/84

* cited by examiner

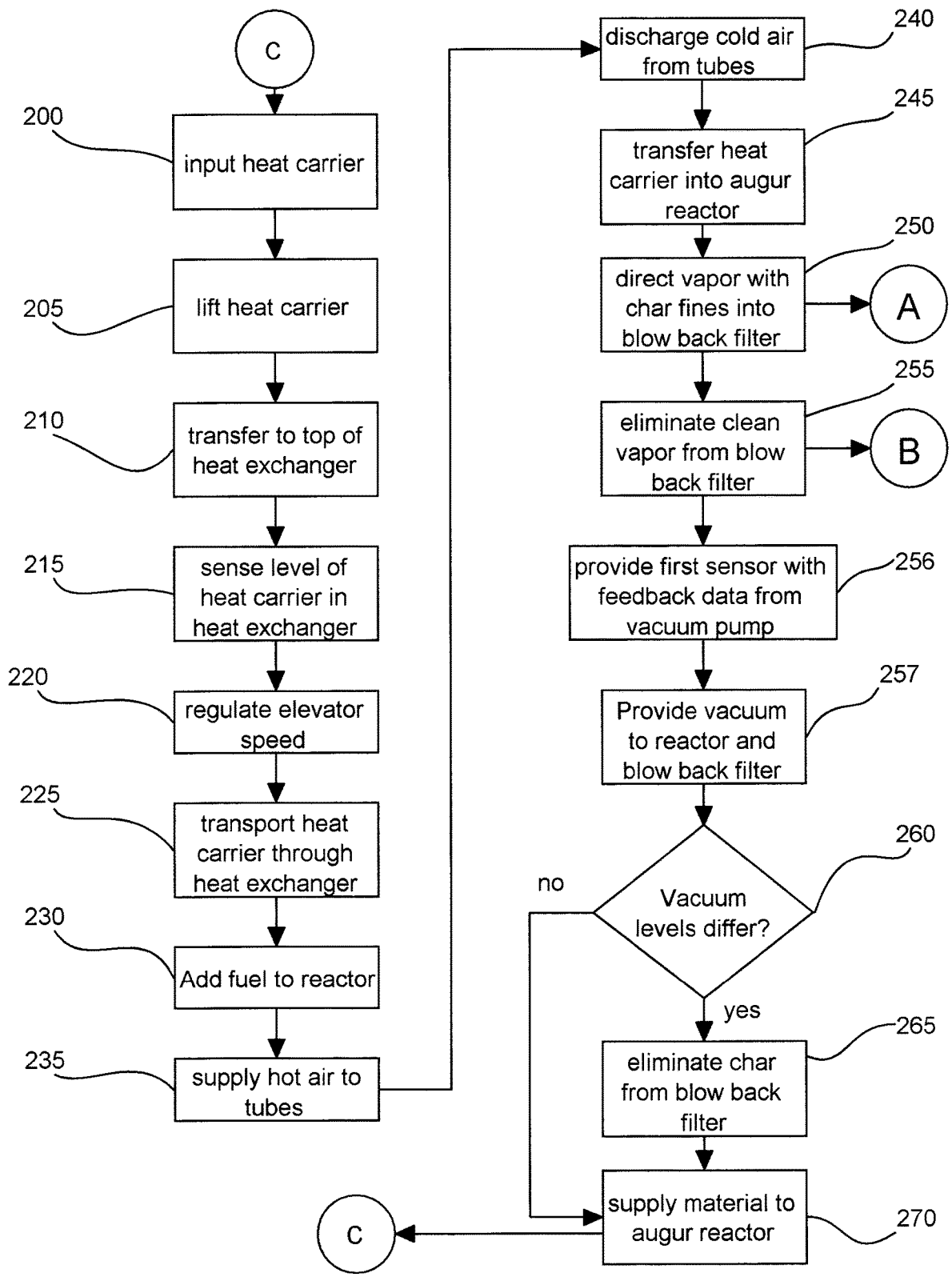

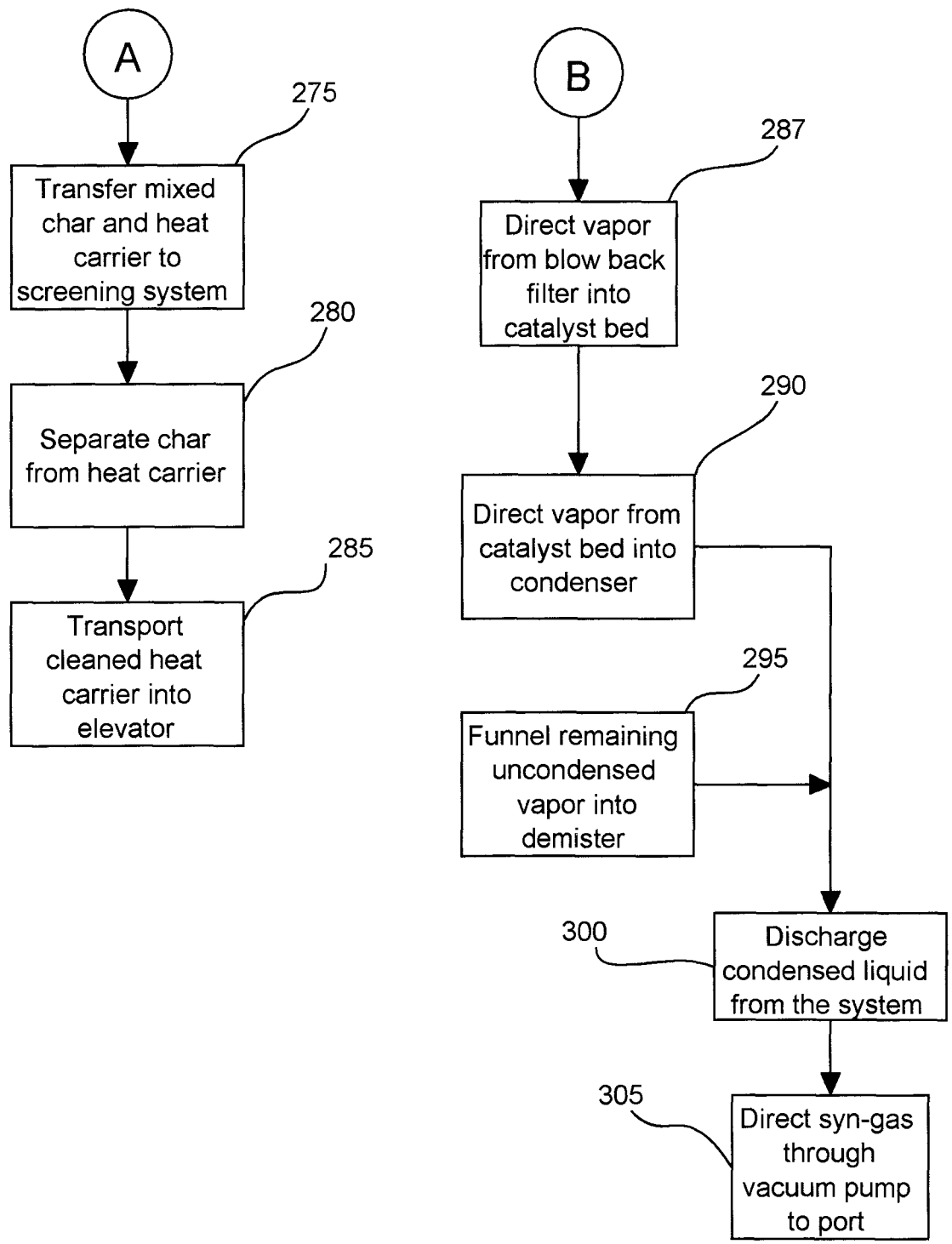

FAST PYROLYSIS HEAT EXCHANGER SYSTEM AND METHOD

CROSS-REFERENCES TO RELATED APPLICATIONS

This application is a continuation of U.S. application Ser. No. 11/722,069, filed Dec. 20, 2012, which claims the benefit of U.S. application Ser. No. 13/681,450, filed Nov. 20, 2012, which claims the benefit of U.S. provisional application No. 61/563,571, filed Nov. 23, 2011. All of the aforementioned patent applications are wholly incorporated herein by reference.

TECHNICAL FIELD

The subject invention relates generally to a heat exchanger system for use in a fast pyrolysis system. More specifically, the heat exchanger system employs a multi-tube closed loop heat exchanger employing a vacuum-activated hot gas blow back filter.

BACKGROUND OF THE INVENTION

Fast pyrolysis is a rapidly developing second generation cellulosic bio-fuel production technology that holds extreme promise for the production of petroleum replacement fuels. The three products that are created by use of this technology are bio-oil, bio-char and syn-gas.

Several major problems exist with various forms of the technology, one of which is difficulty in obtaining rapid transfer of massive quantities of heat to biomass or other material in an oxygen and combustion free environment and in a cost competitive manner, i.e. low energy input and low capital cost input. The transformation from solid biomass to vapor to liquid at a specific controlled temperature must occur within a two to three second interval in order to be economical and viable. Some fast pyrolysis systems use direct heat transfer of heat to biomass or other material through direct surface contact with the reactor. This is problematic because the amount of surface area required to perform the reaction is very large thus requiring a larger reactor and making even application of heat difficult. Other systems use a moving heat carrier of either sand, steel shot, ceramic shot, or some form of catalyst. These systems use an open loop furnace whereby the heat carrier and char mixture is moved from the oxygen free environment to the furnace to be combusted, to remove the char from the heat carrier and to re-heat the heat carrier to be returned to the reactor to continue the process. The problem in these systems is that the oxygen free integrity of the system is compromised and the char cannot be harvested for sale as an additional value added product. Furthermore, precision control of the temperature of the heat carrier is not possible.

Bio-oil produced via fast pyrolysis is fast becoming a substitute for crude oil. However, the oil must first be upgraded by removing the oxygen, neutralizing the pH and removing the entrained char fines. Some fast pyrolysis systems attempt to remove the char fines by mechanical separation in the reactor, passing the vapor through a cyclone or passing the vapor through a ceramic baghouse before condensing in the condensers. The entrained char fines in the vapor destabilize the oil and thus must be removed. The cyclone system does not remove fine material thus allowing the char to stay in the vapor and is only good for removing larger particles or entrained heat carrier normally sand. The mechanical system removes a large portion of the char by volume, but, again not the fine char particles. The ceramic baghouse system causes the vapor to condense on the ceramic bags forming a hard crust and is therefore useless in operation. One attempt to address these problems has been a hot gas blow back filter developed by Pall Corporation that utilizes a porous metal or ceramic filter media which filters the vapor via char cake buildup on the porous metal or ceramic elements in a controlled method by differential pressure as applied from the input side of the filter. But, relatively high pressure applications used in fast pyrolysis systems are problematic because it is difficult to control the vapor flow rate through the condensers, and there are also problems with sealing of the oxygen free environment needed in order for the system to work.

SUMMARY OF THE INVENTION

The present invention relates to a system and method for efficiently and economically producing products such as bio-oil through fast pyrolysis. The system is comprised of a closed loop multi-tube heat exchanger with a hot air input and cold air output, an elevator for transporting heat carrier to the top of the heat exchanger, a control probe attached to the heat exchanger to monitor the level of heat carrier therein and adjust the speed of the elevator to compensate for the amount of heat carrier delivered to the heat exchanger and an regulator auger for moving the heat carrier through the heat exchanger and through an output into an auger reactor. The reactor has a first input for receiving biomass or other combustible material deposited therein, a second input for receiving heat carrier discharged from the regulator auger, a first reactor output connected to a discharge passageway which itself is connected to a vacuum-operated blow back filter having a clean vapor output passageway and a char output passageway and a second reactor output connected to a screening device. An electronic control device connected to a first sensor located in the reactor discharge passageway and a second sensor located in the clean vapor output passageway of the blow back filter monitors the vacuum differential between the first and second sensor. The control device controls the speed of a vacuum pump which provides a vacuum to the reactor and the blow back filter. When the vacuum differential falls below a known, predetermined amount, the control device activates the blow back filter to remove excess char from the filter. In the method employed, heat carrier is inserted into the input passageway of the elevator. The heat carrier is lifted to the top of the elevator and transferred to the top of the heat exchanger. The level of the heat carrier in the heat exchanger is sensed through a control probe and the speed of the elevator is regulated depending on the level of the heat carrier in the heat exchanger as sensed by the control probe. Combustible fuel is added to the reactor through a first reactor input and hot air is supplied to the heat exchanger tubes through a hot air input passageway. The heat carrier is transported from the heat exchanger by means of the auger. After the hot air has circulated through the tubes within the heat exchanger, its temperature drops and the resulting cold air is discharged from the heat exchanger through a cold air discharge passageway. Heat carrier is transferred from the heat exchanger to the reactor through a second reactor input. Vapor containing char fines is discharged from the reactor through the reactor discharge passageway into the blow back filter.

BRIEF DESCRIPTION OF THE DRAWINGS

The foregoing and other objects, aspects and advantages of the invention will be better understood from the following detailed description of the invention with reference to the drawings, in which

FIGS. 4A and 4B are a block diagrammatic view of one embodiment of the process as disclosed herein by which a heat exchanger system operates.

DETAILED DESCRIPTION OF THE INVENTION

Figure 1:
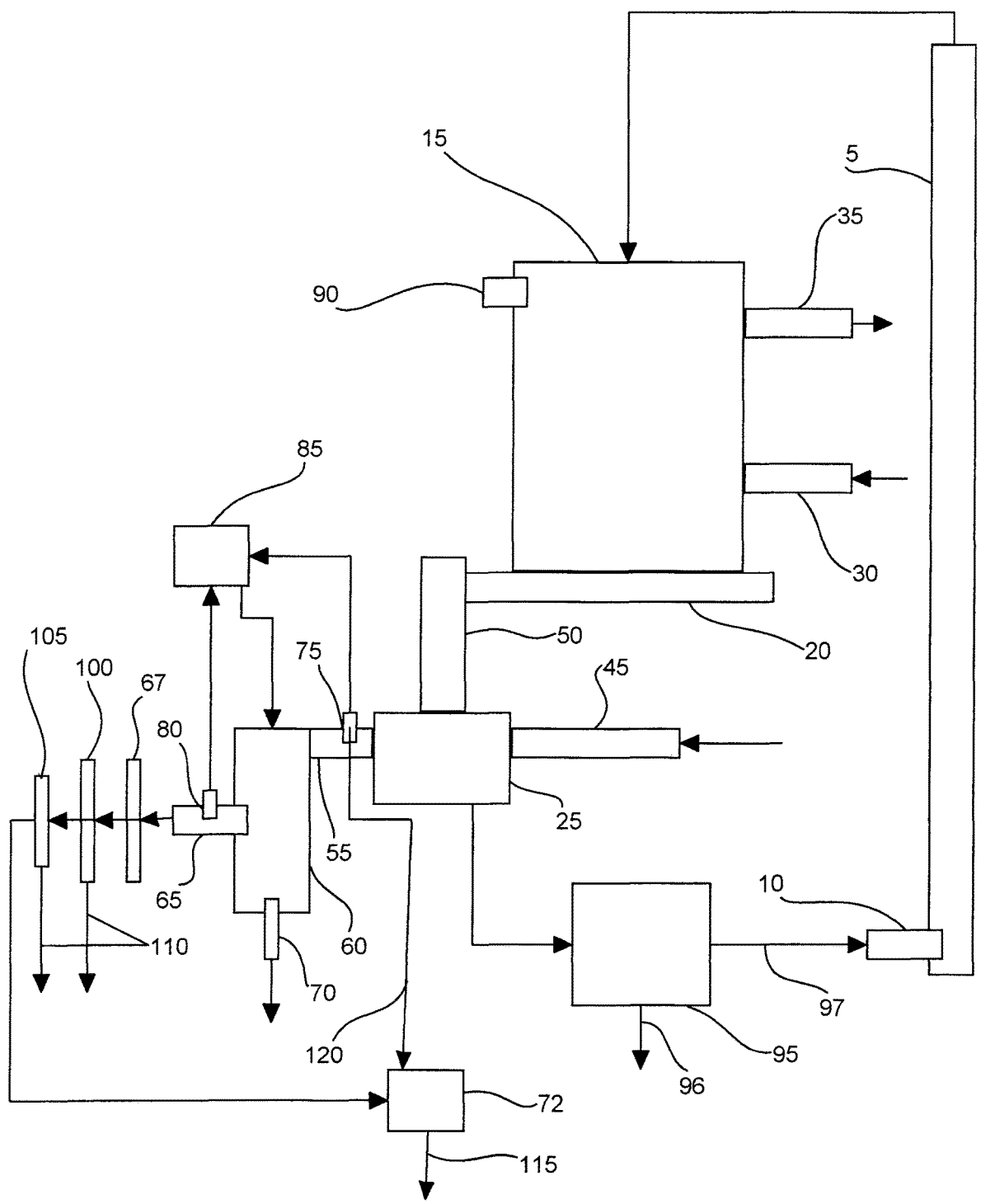
FIG. 1 is a block diagrammatic view of one embodiment of the disclosed heat exchanger system.

FIG. 1 shows a block diagram view of the elements of a multi-tube, closed loop heat exchanger system comprised of an elevator 5, such as a vertical screw rotating shell, bucket or drag chain type or other suitable device for raising heat carrier, a multi-tube heat exchanger 15, a heat carrier regulator auger 20, a reactor 25 such as an auger or rotating shell reactor or any other type of reactor suitable for this purpose, a vacuum-operated hot gas blow back filter 60 controlled by electronic filter control device 85 and a control probe 90.

Heat carrier is deposited in elevator 5 at input passageway 10. The heat carrier is then transported to the top of the heat exchanger by means of elevator 5. The flow of the heat carrier through heat exchanger 15 is controlled by horizontal auger 20 located at the bottom of heat exchanger 15 just prior to auger reactor 25. Heat exchanger 15 includes a hot air input passageway 30 and a cold air discharge passageway 35. Hot air is fed into heat exchanger 15 and circulates therein through multiple closed loop tubes 40. Reactor 25 has a first reactor input 45 for feeding biomass or other material into reactor 25 and a second reactor input 50 for transferring heat carrier material from augur 20 into reactor 25. Vapor containing char fines is discharged from reactor 25 through a first reactor output into reactor discharge passageway 55 from which it is directed into blow back filter 60. Clean vapor is discharged from blow back filter 60 through clean vapor output passageway 65 and char is separately discharged through char output passageway 70. The hot heat carrier is modulated to reactor 25 by horizontal auger 20 where it is blended with the material to be converted thus controlling precisely the temperature and flow rate of the heat carrier. As the heat carrier moves through heat exchanger 15 it is isolated from contact with hot air which is confined to tubes 40. Because the heat carrier does not come into contact directly with the hot air there is no compromise of the oxygen free environment. Hot air from any source can be used to heat the heat exchanger tubes thus allowing the char to be harvested and the cheapest source of fuel can be utilized, i.e. raw biomass.

Many of the problems associated with known applications of hot gas blow back filters have been resolved by employing the known hot gas blow back filter from Pall Corporation or other designs operating similarly. However, greater efficiency and better control of char cake buildup necessary to perform the filtering of the vapor can be achieved by monitoring and adjusting the difference in vacuum level measured between the input and the output of filter 60. For that purpose, vacuum pump 72 provides a vacuum to reactor 25 and to blow back filter 60. First vacuum sensor 75 is located in passageway 55 and second vacuum sensor 80 is located in passageway 65. Both sensors are connected to electronic control device 85 which monitors the vacuum levels at the two sensors. As the system operates, char cake builds up on the elements of filter 60 causing a decrease in vacuum level within reactor 25 and adversely affecting the performance of reactor 25 due to its thickness. When the vacuum level drops below a predetermined point, device 85 activates blow back filter 60 so as to restore the vacuum level to within its desired, known operating range thereby ensuring precision filtering and movement of the vapor through the condensers after filtration. A vacuum-controlled system is superior because it (1) allows the rest of the pyrolysis system to operate at low to atmospheric pressure thus avoiding sealing problems in the rest of the system, (2) allows for precision control of the vapor flow through the condensers and (3) allows for the even deposition of char on to the filter elements resulting in more precision operation.

Control probe 90 is located at the input of heat exchanger 15 and is used to regulate the level of heat carrier in the heat exchanger by controlling the operating speed of elevator 5. Probe 90 functions to either speed up or slow down vertical elevator 5 to add more or less heat carrier to heat exchanger 15 thereby keeping heat exchanger 15 full without overfilling it. Probe 90 may be a contact type probe or any other suitable type of probe for performing this function.

A combination of heat carrier and char is ejected from reactor 25 through a second reactor output into screening system 95 which may be a rotating, vibrating or any other type of mechanism suitable for separating the heat carrier from the char. The char passes through the screen to be removed from the system through first output 96 while the remaining cleaned heat carrier is transported for reuse from screening system 95 through second output 97 into input passageway 10 of elevator 5.

The vapor output of filter 60 is transmitted through passageway 65 into catalyst bed 67 which chemically upgrades the vapor into a higher quality vapor or at least one having a more desirable quality. The materials used in the catalyst can be any of a wide variety of materials depending on the desired product to be produced. However, catalysts belonging to the Zeolite family have proven particularly useful. The vapor exits catalyst bed 67 into the input of condensation device 100 the purpose of which is to condense clean vapor into a liquid fuel. In the preferred embodiment, four condensers are used in a closed system arrangement although a larger or smaller number of condensers may also be employed. Water may be collected from the condensation tubes and is suitable for use as process water or for irrigation. The tubes carry cooling media around and across which the clean vapor is directed. Ethyl glycol or any other suitable cooling substance may be placed in and circulated through the tubes of condensation device 100. Vapors which cannot be condensed in device 100 are transmitted through a first output to the input of demister 105 in a further attempt to condense them. Demister 105 can be of any type suitable for this task, such as, but not limited to, a vane or cyclone type device. Liquid bio oil resulting from successful condensation operations in condensation device 100 and demister 105 exits those elements through ports 110 corresponding to the second output of condensation device 100 and the second output of demister 105. Bio oil so recovered can the be used as a fuel. Syn-gas leaves demister 105 via the first output of demister 105 and passes through vacuum pump 72 before being discharged from the system through exit pipe 115 or another similar device. This gas can then be used as clean, syn-gas from which vapor which has been totally removed by condensation device 100 and demister 105. It should be noted that vacuum pump 72 maintains a vacuum on the entire system all the way back to reactor 25 and is controlled through feedback loop 120 from first vacuum sensor 75. Feedback loop 120 transmits vacuum pressure data to pump 72.

Figure 2:
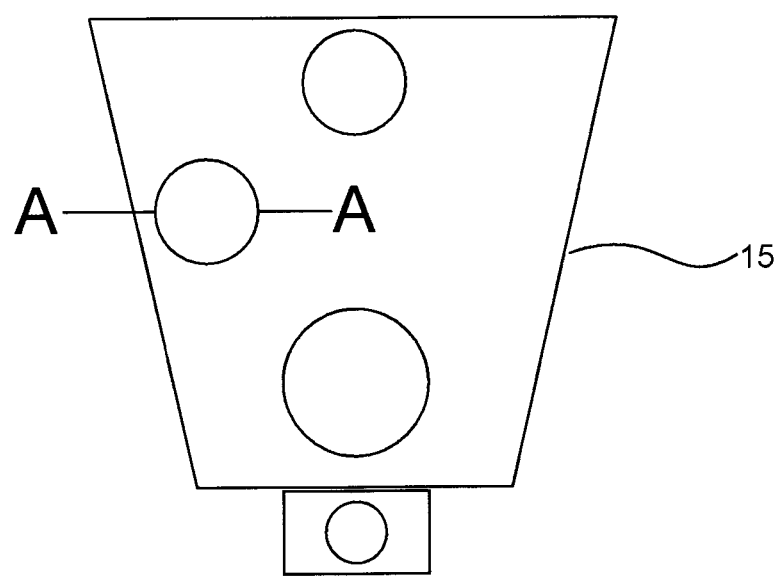
FIG. 2 is a side view of one embodiment of the disclosed heat exchanger system.
Figure 3:
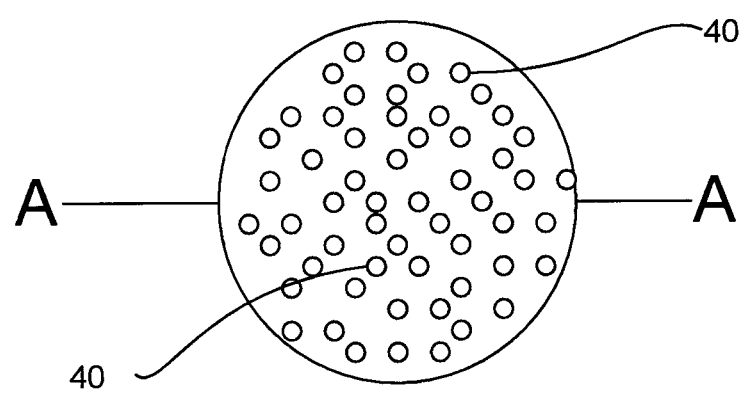
FIG. 3 is a cross-sectional view of the disclosed heat exchanger along line A-A of FIG. 2.

The disclosed system solves problems experienced in large reactors in which the oxygen free environment is compromised due to use of an open loop system. Furthermore, it allows for the harvest of the bio-char and enables precision control of the temperature of the heat carrier by utilizing multiple small diameter tubes spaced closely together as shown in the cross-section of FIG. 3 which depicts a cross sectional view of the inside of part of heat exchanger 15 along line A-A of FIG. 2. These tubes are used to heat the solid heat carrier. The diameter of the heat exchanger tubes may be one inch although other diameters may be appropriate depending on the construction of heat exchanger 15. Such compact spacing allows for a massive amount of surface area exposure in any type of moving heat carrier including steel shot, ceramic shot or catalyst as the heat carrier moves down through the heat exchanger from top to bottom.

The process by which the heat exchanger operates is demonstrated with reference to the block diagram of FIG. 4A and FIG. 4B. At 200, the heat carrier is input to vertical elevator 5 and is lifted vertically at 205. Then, it is transferred from the elevator to the top of heat exchanger 15 at 210. The level of heat carrier in heat exchanger 15 is sensed by probe 90 at 215. Depending on that sensed level, the speed of elevator 5 is increased at 220 to raise the level or decreased to allow the level to become lower. As the heat carrier is caused to move down through heat exchanger 15 due to activation of horizontal regulator augur 20 at 225, combustible fuel is added to reactor 25 at 230 and hot air is supplied to the closed loop tubes within heat exchanger 15 at 235. Once hot air has circulated through heat exchanger 15 and its temperature has dropped, it is expelled from heat exchanger 15 through cold air discharge passageway 35 at 240. Auger 20 also causes the transfer of the heat carrier into augur reactor 25 at 245. Vapor containing char fines exits reactor 25 at 250 and is directed into hot gas blow back filter 60. Clean vapor leaves hot gas blow back filter 60 at 255. Vacuum pump 72 receives feedback data from first vacuum sensor 75 at 256 using feedback loop 120. Relying in part on that data, vacuum pump 72 provides a continuous vacuum to reactor 25 and blow back filter 60 at 257. Control device 85 monitors vacuum differentials at 260 between the input and output of blowback filter 60 to determine if a predetermined vacuum differential exists. If so, control device 85 triggers elimination of char from filter 60 at 265. Otherwise, auger reactor 25 is supplied with further biomass or other combustible material through its input at 270 and the process continues at 200. Referring now to FIG. 4B, used heat carrier mixed with char is transferred from reactor 25 to screening apparatus 95 at 275. There the char and heat carrier are separated from each other at 280 and the cleaned heat carrier is transported back into elevator 5 at 285. The clean vapor which has been eliminated from blow back filter 60 at 255 is directed at 287 through catalyst bed 67 and from there into condensation device 100 at 290. Uncondensed vapor remaining after travelling through condensation device 100 is further directed through demister 105 at 295. Liquid bio oil recovered from these condensation processes is discharged from the system at the second outputs of condensation device 100 and demister 105 through ports 110 at 300. The noncondensable syn-gas leaves demister 105 through its first output, passes through vacuum pump 72 and then exits the system through port 115 at 305.

In the disclosed heat exchanger system, heat transfer is accomplished indirectly by supplying hot air to a closed, multi-tube loop wherein the tubes are surrounded by solid heat carrier. This system allows for a massive amount of heat to be transferred to the heat carrier which subsequently transfer that heat to biomass in an oxygen free environment. Furthermore, the system occupies a relatively small physical footprint and provides for precision control of the reaction temperature with no post cracking of the vapor which otherwise occurs in a direct heat transfer system. Unlike other heat exchanger systems which heat fluid on one side of the heat exchanger and hot air on the other side or heat two different fluids on opposing sides of the heat exchanger, the disclosed system employs hot air on one side of the heat exchanger and solid heat carrier on the other side. In addition, the disclosed system employs a vacuum operated hot gas blow back filter instead of pressure-operated blow back filters as are commonly used in other filter systems.

While the invention has been described in its preferred embodiments, it is to be understood that the words which have been used are words of description rather than of limitation and that changes may be made within the purview of the appended claims without departing from the true scope and spirit of the invention in its broader aspects. Rather, various modifications may be made in the details within the scope and range of equivalents of the claims and without departing from the spirit of the invention. The inventor further requires that the scope accorded the claims be in accordance with the broadest possible construction available under the law as it exists on the date of filing hereof (and of the application from which this application obtains priority, if any) and that no narrowing of the scope of the appended claims be allowed due to subsequent changes in the law, as such a narrowing would constitute a taking without due process or just compensation.

I claim as my invention:

1. A fast pyrolysis heat exchanger system using a granular solid heat carrier comprising:
    a) a multi-tube heat exchanger having a hot air input passageway connected to one end of the tubes and a cold air discharge passageway connected to the other end of the tubes;
    b) an elevator having an input passageway for lifting the heat carrier from the top of the input passageway to the top of the heat exchanger;
    c) a control probe associated with said heat exchanger for sensing the level of heat carrier in the heat exchanger and for regulating the speed at which the elevator operates;
    d) an auger located at the bottom of the heat exchanger for controlling the movement of the heat carrier through the heat exchanger and for discharging heat carrier from the auger through an output therefrom.

2. The fast pyrolysis heat exchanger system of claim 1 wherein the elevator comprises a vertical fixed auger contained within a rotating shell.

3. The fast pyrolysis heat exchanger of claim 2 wherein the elevator is airtight.

4. The fast pyrolysis heat exchanger system of claim 1 wherein the auger located at the bottom of the heat exchanger stops the flow of heat carrier from the heat exchanger when not rotating, thereby preventing the heat exchanger from emptying.

5. The fast pyrolysis heat exchanger system of claim 1 additionally comprising a reactor having at least a first reactor input wherein the first reactor input is an inverted funnel shape, thereby preventing bridging of material flowing through the first reactor input.

* * * * *